United States Patent
Jiang

(10) Patent No.: US 8,238,373 B2
(45) Date of Patent: Aug. 7, 2012

(54) METHOD AND DEVICE FOR MAPPING ETHERNET CODE BLOCKS TO OTN FOR TRANSMISSION

(75) Inventor: Zhangzhen Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 12/634,122

(22) Filed: Dec. 9, 2009

(65) Prior Publication Data

US 2010/0086300 A1    Apr. 8, 2010

Related U.S. Application Data

(63) Continuation of application No. PCT/CN2008/071475, filed on Jun. 27, 2008.

(30) Foreign Application Priority Data

Jun. 29, 2007    (CN) .......................... 2007 1 0129552

(51) Int. Cl.
*H04J 3/24* (2006.01)
(52) U.S. Cl. .......................................... 370/474; 398/43
(58) Field of Classification Search .................. 370/474, 370/466, 475; 398/43–46
See application file for complete search history.

(56) References Cited

U.S. PATENT DOCUMENTS

| | | | |
|---|---|---|---|
| 2002/0090007 A1* | 7/2002 | Kamiya et al. | 370/476 |
| 2004/0202198 A1 | 10/2004 | Walker et al. | |
| 2004/0205230 A1* | 10/2004 | Fontana et al. | 709/236 |
| 2004/0252720 A1* | 12/2004 | Xiong et al. | 370/473 |
| 2005/0276223 A1* | 12/2005 | Maggi et al. | 370/235 |
| 2006/0104309 A1* | 5/2006 | Vissers et al. | 370/474 |
| 2007/0211750 A1* | 9/2007 | Li et al. | 370/445 |
| 2008/0279553 A1* | 11/2008 | Meagher et al. | 398/58 |

FOREIGN PATENT DOCUMENTS

| | | |
|---|---|---|
| CN | 1747606 A | 3/2006 |
| CN | 1773898 A | 5/2006 |
| CN | 1852215 A | 10/2006 |
| EP | 1 657 839 A1 | 5/2006 |
| EP | 1 670 175 A1 | 6/2006 |
| WO | 2006/009732 A1 | 1/2006 |
| WO | 2006/063521 A1 | 6/2006 |

OTHER PUBLICATIONS

Duelk, M., "Considerations for 40 Gigabit Ethernet," IEEE HSSG Meeting, Geneva, Switzerland, May 28-31, 2007, pp. 4-6.

(Continued)

*Primary Examiner* — Gary Mui
(74) *Attorney, Agent, or Firm* — Leydig, Voit & Mayer, Ltd.

(57) ABSTRACT

A method and a device for mapping Ethernet code blocks to an optical transport network (OTN) for transmission are provided. According to a preset mapping manner, 40 Gigabit (40 G) Ethernet code blocks are mapped to a payload area of a general frame provision (GFP) frame, or a plurality of 40 G Ethernet code blocks is interleaved into a payload area of an OTN frame, or 40 G Ethernet code blocks are mapped to an OTN frame according to an asynchronous bit-stream mapping manner. Thus, specific solutions for mapping 40 G Ethernet code blocks having an encoding rate lower than a minimum payload bandwidth of the OPU3 to the OTN for transmission is provided.

15 Claims, 10 Drawing Sheets

---

A plurality of 40G Ethernet code blocks is mapped to a payload area of a GFP frame according to a preset mapping manner, and a header UPI of the GFP frame is set to identify the mapping manner — S101

↓

The obtained GFP frame is mapped to an OPU3 of an OTN, and is sent out. When the GFP frame is sent, if it is found that payload data in the GFP frame is not enough to maintain continuous data transmission, justification control is performed on the GFP frame — S102

OTHER PUBLICATIONS

ITU-T, Interfaces for the Optical Transport Network, ITU-T G.709/Y.1331, Mar. 2003, p. 57, section 17.1, p. 60, section 17.1.3.

Extended European Search Report in counterpart European Application No. 08757874.6-1237, mailed Jul. 29, 2010.

"Series G: Transmission Systems and Media, Digital Systems and Networks—Transport of IEEE 10G Base-R in Optical Transport Networks (OTN)," *International Telecommunication Union*, Series G—Supplement 43 (Nov. 2006).

"Introduction of GFP [Generic Framing Procedure]," [date unknown].

"IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications—Amendment 1: Media Access Control (MAC) Parameters, Physical Layers, and Management Parameters for 10 Gb/s Operation," *IEEE*, Standard No. 802.3ae-2002 (Amendment to IEEE Standard 802.3-2002), Aug. 30, 2002.

Written Opinion of counterpart PCT Application No. PCT/CN2008/071475, mailed Sep. 4, 2008.

Duelk, Marcus [of Bell Labs / Alcatel-Lucent], "Considerations for 40 Gigabit Ethernet," IEEE HSSG Meeting, Geneva, Switzerland, May 28-31, 2007.

International Search Report in corresponding PCT Application No. PCT/CN2008/071475 (Sep. 4, 2008).

1st Office Action in corresponding Chinese Application No. 200710129552.2 (Aug. 23, 2011).

\* cited by examiner

|   | 1 | 7 | 8 | 14 | 15 | 16 | 17 | | 3824 | 3825 | 4080 |
|---|---|---|---|---|---|---|---|---|---|---|---|

| 1 | | OTU*k* OH | | | | | | | |
| 2 | ODU*k* OH | | OPU*k* OH | OPU*k* Payload | | OTU*k* FEC |
| 3 | | | | | | |
| 4 | | | | | | |

FIG. 1

A plurality of 40G Ethernet code blocks is mapped to a payload area of a GFP frame according to a preset mapping manner, and a header UPI of the GFP frame is set to identify the mapping manner — S101

The obtained GFP frame is mapped to an OPU3 of an OTN, and is sent out. When the GFP frame is sent, if it is found that payload data in the GFP frame is not enough to maintain continuous data transmission, justification control is performed on the GFP frame — S102

FIG. 4

A plurality of 40G Ethernet code blocks having an encoding rate smaller than a payload rate corresponding to an OPU3 is mapped to an OTN frame corresponding to the OPU3 as a bit stream within a justification range according to an asynchronous bit-stream mapping manner, an identifier for indicating the asynchronous bit-stream mapping manner is assigned in a PSI of the OTN frame, an offset of a certain code block in the bit stream relative to a certain position of the OTN frame is recorded, and an indicator for indicating the offset position is set — S301

The OTN frame is sent. When the OTN frame is sent, if it is found that data in the payload area of the OTN frame is not enough, justification control is performed on the OTN frame — S302

FIG. 9

METHOD AND DEVICE FOR MAPPING ETHERNET CODE BLOCKS TO OTN FOR TRANSMISSION

CROSS-REFERENCE TO RELATED APPLICATIONS

This application is a continuation of International Application No. PCT/CN2008/071475, filed on Jun. 27, 2008, which claims priority to Chinese Patent Application No. 200710129552.2, filed on Jun. 29, 2007, both of which are hereby incorporated by reference in their entireties.

FIELD OF THE TECHNOLOGY

The present invention relates to the field of communication, and more particularly to a technology of mapping Ethernet code blocks to an optical transport network (OTN) for transmission.

BACKGROUND OF THE INVENTION

With the increasing bandwidth requirements caused by the increase in people's demand for voice, data, multimedia, and other services, the OTN has gradually become a core platform for bearer services of various operators. Transmission of 40 Gigabit (40 G) Ethernet service data on the OTN is currently considered a hot topic.

FIG. 1 is a schematic structural view of an OTN frame. As shown in FIG. 1, the OTN frame includes an Optical Channel Payload Unit-k (OPUk) payload, an Optical Channel Transport Unit-k (OTUk) Forward Error Correction (FEC), and the following overhead (OH) portion caused by transmitting the payload:

OPUk OH; optical channel data unit-k (ODUk) OH; and OTUk OH.

FIG. 2 is a schematic view of an OH structure of the OTN frame shown in FIG. 1. Referring to FIG. 2, a client specific portion is set at positions corresponding to $15^{th}$ and $16^{th}$ bytes. The portion contains a payload structure identifier (PSI) occupying one byte.

OPU types and capacity corresponding to the OPUk are as shown in Table 1.

TABLE 1

| OPU Type | OPU Payload nominal bit rate | OPU Payload bit rate tolerance |
| --- | --- | --- |
| OPU1 | 2 488 320 kbit/s | ±20 ppm |
| OPU2 | 238/237 × 9 953 280 kbit/s | |
| OPU3 | 238/236 × 39 813 120 kbit/s | |
| OPU1-Xv | X * 2 488 320 kbit/s | ±20 ppm |
| OPU2-Xv | X * 238/237 * 9 953 280 kbit/s | |
| OPU3-Xv | X * 238/236 * 39 813 120 kbit/s | |

NOTE
The nominal OPUk Payload rates are approximately: 2 488 320.000 kbit/s (OPU1 Payload), 9 995 276.962 kbit/s (OPU2 Payload) and 40 150 519.322 kbit/s (OPU3 Payload). The nominal OPUk-Xv Payload rates are approximately: X*2 488 320.000 kbit/s (OPU1-Xv Payload), X*9 995 276.962 kbit/s (OPU2-Xv Payload) and X*40 150 519.322 kbit/s (OPU3-Xv Payload).

It can be seen that, the payload bandwidth of the OPU3 is 40.150519322 GBits/s, which is slightly higher than 40 GBits/s. Considering a clock offset of −20 ppm in the OTN, the minimum payload rate of the OPU3 is 40.150519322 GBits/s*0.999980=40.149716311 GBits/s.

Currently, it is suggested that 40 G Ethernet service data be encoded through a 64/66B encoding scheme, and that the encoding rate required by the physical (PHY) layer for transmitting code blocks be 66/64*40 GBits/s=41.25 GBits/s.

Since the payload bandwidth of the OPU3 is smaller than the encoding rate required by the 40 G Ethernet PHY layer, 40 G Ethernet service data cannot be directly borne by the OPU3, and the encoding rate of 40 G Ethernet code blocks needs to be reduced to be lower than the minimum payload bandwidth of the OPU3.

Although the payload bandwidth requirements for transmission of the 40 G Ethernet code blocks in the OTN can be met after the encoding rate of the 40 G Ethernet code blocks is reduced to be lower than the minimum payload bandwidth of the OPU3, no specific solution for mapping the 40 G Ethernet code blocks to the OTN is provided currently.

SUMMARY OF THE INVENTION

Accordingly, the present invention is directed to a method and a device for mapping Ethernet code blocks to an OTN for transmission, so as to provide specific solutions for mapping 40 G Ethernet code blocks having an encoding rate lower than a minimum payload bandwidth of an OPU3 to the OTN for transmission.

The present invention is realized through the following technical solutions.

In an embodiment, the present invention provides a method for mapping Ethernet code blocks to an OTN for transmission, which includes the following steps.

The 40 G Ethernet code blocks are mapped to a payload area of a general frame provision (GFP) frame according to a preset mapping manner, and a corresponding identifier is set to identify the mapping manner.

The GFP frame is mapped to an OTN, and the GFP frame is then sent out.

In an embodiment, the present invention further provides a sending device, which includes a mapping unit and a transmission unit.

The mapping unit is adapted to map 40 G Ethernet code blocks to a payload area of a GFP frame according to a preset mapping manner, and set a corresponding identifier to identify the mapping manner.

The transmission unit is adapted to map the GFP frame to an OTN, and send the GFP frame.

In an embodiment, the present invention further provides a method for mapping Ethernet code blocks to an OTN for transmission, which includes the following steps.

A received GFP frame is decoded to obtain an identifier for identifying a mapping manner, and obtain a mapping manner for mapping 40 G Ethernet code blocks to a payload area of the GFP frame according to a value of the identifier.

The 40 G Ethernet code blocks in the GFP frame are decoded according to the mapping manner.

In an embodiment, the present invention further provides a receiving device, which includes an information acquisition unit and a decoding unit.

The information acquisition unit is adapted to decode a received GFP frame to obtain an identifier for identifying a mapping manner, and obtain a mapping manner for mapping 40 G Ethernet code blocks to a payload area of the GFP frame according to a value of the identifier.

The decoding unit is adapted to decode the 40 G Ethernet code blocks in the GFP frame according to the mapping manner.

In an embodiment, the present invention further provides a method for mapping Ethernet code blocks to an OTN for transmission, which includes the following steps.

The 40 G Ethernet code blocks are inserted into a payload area of an OTN frame corresponding to an OPU3 according to a mapping manner for arranging a predetermined number of 40 G Ethernet code blocks in each row of the OTN frame, and a corresponding mapping manner indication identifier is set at an OH portion of the OTN frame to indicate the mapping manner.

The obtained OTN frame is mapped to the OPU3 of the OTN, and the OTN frame is then sent out.

In an embodiment, the present invention further provides a sending device, which includes a mapping unit and a transmission unit.

The mapping unit is adapted to insert 40 G Ethernet code blocks into a payload area of an OTN frame corresponding to an OPU3 according to a mapping manner for arranging a predetermined number of 40 G Ethernet code blocks in each row of the OTN frame, and set a corresponding mapping manner indication identifier at an OH portion of the OTN frame to indicate the mapping manner.

The transmission unit is adapted to map the obtained OTN frame to the OPU3 of the OTN, and send the OTN frame.

In an embodiment, the present invention further provides a method for mapping Ethernet code blocks to an OTN for transmission, which includes the following steps.

A received OTN frame is decoded to obtain a mapping manner indication identifier, and obtain a mapping manner for arranging a predetermined number of 40 G Ethernet code blocks in each row of the OTN frame corresponding to an OPU3 according to the mapping manner indication identifier.

The 40 G Ethernet code blocks are decoded in the OTN frame according to the mapping manner.

In an embodiment, the present invention further provides a receiving and processing device, which includes an information acquisition unit and a decoding unit.

The information acquisition unit is adapted to decode a received OTN frame to obtain a mapping manner indication identifier, and obtain a mapping manner for arranging a predetermined number of 40 G Ethernet code blocks in each row of the OTN frame corresponding to an OPU3 according to the mapping manner indication identifier.

The decoding unit is adapted to decode the 40 G Ethernet code blocks in the OTN frame according to the mapping manner.

In an embodiment, the present invention further provides a method for mapping Ethernet code blocks to an OTN for transmission, which includes the following steps.

The 40 G Ethernet code blocks are mapped to an OTN frame corresponding to an OPU3 as a bit stream within a justification range according to an asynchronous bit-stream mapping manner, an identifier for indicating the asynchronous bit-stream mapping manner is set at an OH portion of the OTN frame, an offset of a certain code block in the bit stream relative to a certain position of the OTN frame is recorded, and an indicator for indicating the offset position is set.

The obtained OTN frame is mapped to the OPU3 of the OTN, and then the OTN frame is sent out.

In an embodiment, the present invention further provides a sending device, which includes a mapping unit and a transmission unit.

The mapping unit is adapted to map 40 G Ethernet code blocks to an OTN frame corresponding to an OPU3 as a bit stream within a justification range according to an asynchronous bit-stream mapping manner, set an identifier for indicating the asynchronous bit-stream mapping manner at an OH portion of the OTN frame, record an offset of a certain code block in the bit stream relative to a certain position of the OTN frame, and set an indicator for indicating the offset position.

The transmission unit is adapted to map the obtained OTN frame to the OPU3 of the OTN, and send the OTN frame.

In an embodiment, the present invention further provides a method for mapping Ethernet code blocks to an OTN for transmission, which includes the following steps.

A received OTN frame is decoded to obtain an indicator for indicating an offset position of a code block and an identifier for indicating a mapping manner, a position of the code block in the OTN frame is located according to the indicator for indicating the offset position of the code block, positions of other code blocks are calculated according to a size of the code block, and it is acquired that the mapping manner for mapping 40 G Ethernet code blocks to the OTN frame is an asynchronous stream mapping manner according to the identifier for indicating the mapping manner.

The 40 G Ethernet code blocks at corresponding positions are decoded according to the asynchronous stream mapping manner.

In an embodiment, the present invention further provides a receiving device, which includes an information acquisition unit and a decoding unit.

The information acquisition unit is adapted to decode a received OTN frame to obtain an indicator for indicating an offset position of a code block and an identifier for indicating a mapping manner, locate a position of the code block in the OTN frame according to the indicator for indicating the offset position of the code block, calculate positions of other code blocks according to a size of the code block, and acquire that the mapping manner for mapping 40 G Ethernet code blocks to the OTN frame is an asynchronous stream mapping manner according to the identifier for indicating the mapping manner.

The decoding unit is adapted to decode the 40 G Ethernet code blocks at corresponding positions according to the mapping manner.

It can be seen from the technical solutions of the present invention that, according to a preset mapping manner, 40 G Ethernet code blocks are mapped to a payload area of a GFP frame, or 40 G Ethernet code blocks are inserted into a payload area of an OTN frame, or 40 G Ethernet code blocks are asynchronously bit-stream mapped to an OTN frame. Thus, the present invention provides specific solutions for mapping 40 G Ethernet code blocks having an encoding rate lower than the minimum payload bandwidth of the OPU3 to the OTN for transmission without changing the mature OTN architecture.

BRIEF DESCRIPTION OF THE DRAWINGS

FIG. 1 is a schematic structural view of an OTN frame;
FIG. 4 is a flow chart according to a first embodiment of the present invention;
FIG. 9 is a flow chart according to a third embodiment of the present invention.

DETAILED DESCRIPTION OF THE EMBODIMENTS

Considering that the GFP is a mapping format commonly used in the OTN, and can bear high-layer client signals over a byte-synchronous transport network, it is feasible to map 40 G Ethernet code blocks having an encoding rate lower than the minimum payload bandwidth of the OPU3 to a GFP frame, and then map the GFP frame to an OPU of an OTN for transmission.

Figure 2:
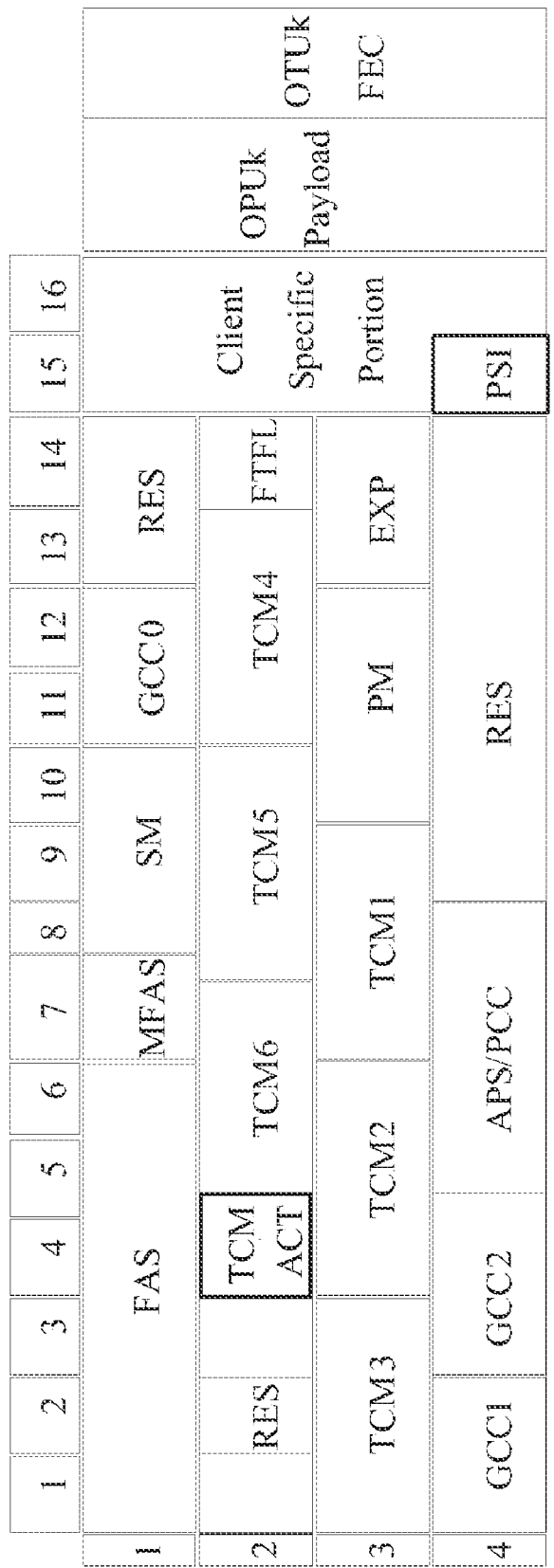
FIG. 2 is a schematic view of an OH structure of the OTN frame.
Figure 3:
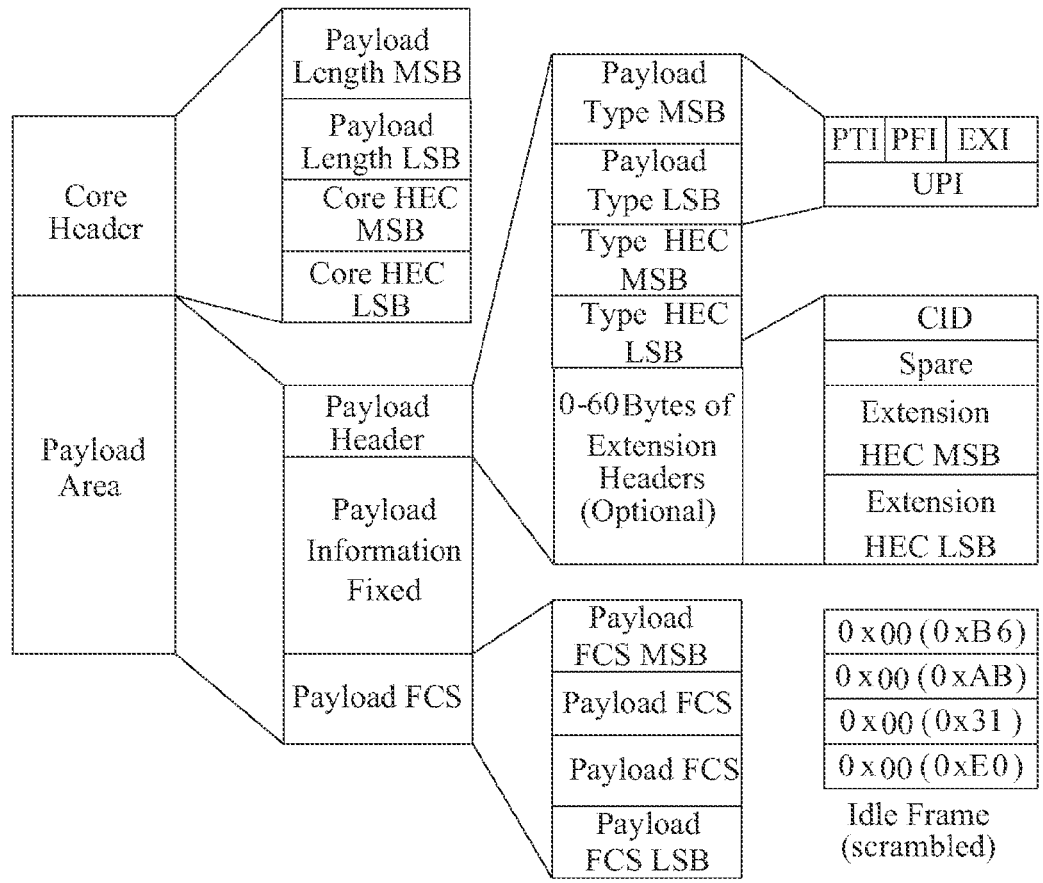
FIG. 3 is a schematic structural view of a GFP frame.

FIG. 3 is a schematic structural view of a GFP frame, which includes a core header and a payload area, and occupies 65535 bytes. The core header occupies 4 bytes, including a payload length most significant bit (MSB), a payload length least significant bit (LSB), a core header error check (HEC) MSB, and a core HEC LSB. The payload area further includes a payload header, a payload information fixed, and a payload frame check sequence (FCS). The payload header includes a payload type MSB, a payload type LSB, a type HEC MSB, a type HEC LSB, and some reserved bytes for extension, and may occupy 60 bytes at most. The payload type MSB and payload type LSB are identified by a payload type identifier (PTI), a payload FCS identifier (PFI), an extension header identifier (EXI), and a user payload identifier (UPI).

Based on the above consideration, in a first embodiment, the present invention provides a method for mapping Ethernet code blocks to an OTN for transmission. Referring to FIG. 4, the method includes the following steps.

In step S101, a plurality of 40 G Ethernet code blocks is mapped to a payload area of a GFP frame according to a preset mapping manner, and a header UPI of the GFP frame is set to identify the mapping manner.

Considering that the GFP frame can bear high-layer client signals over a byte-synchronous transport network, when the 40 G Ethernet code blocks are mapped to the payload area of the GFP frame, it is feasible to take eight 40 G Ethernet code blocks as a code block group, and then map the code block group to the GFP frame. For the convenience of encoding and decoding, Syn fields of all the 40 G Ethernet code blocks are gathered into the first byte and arranged in an order from Syn1 to Syn8, and then all the 40 G Ethernet code blocks are arranged after the first byte sequentially.

Figure 5:
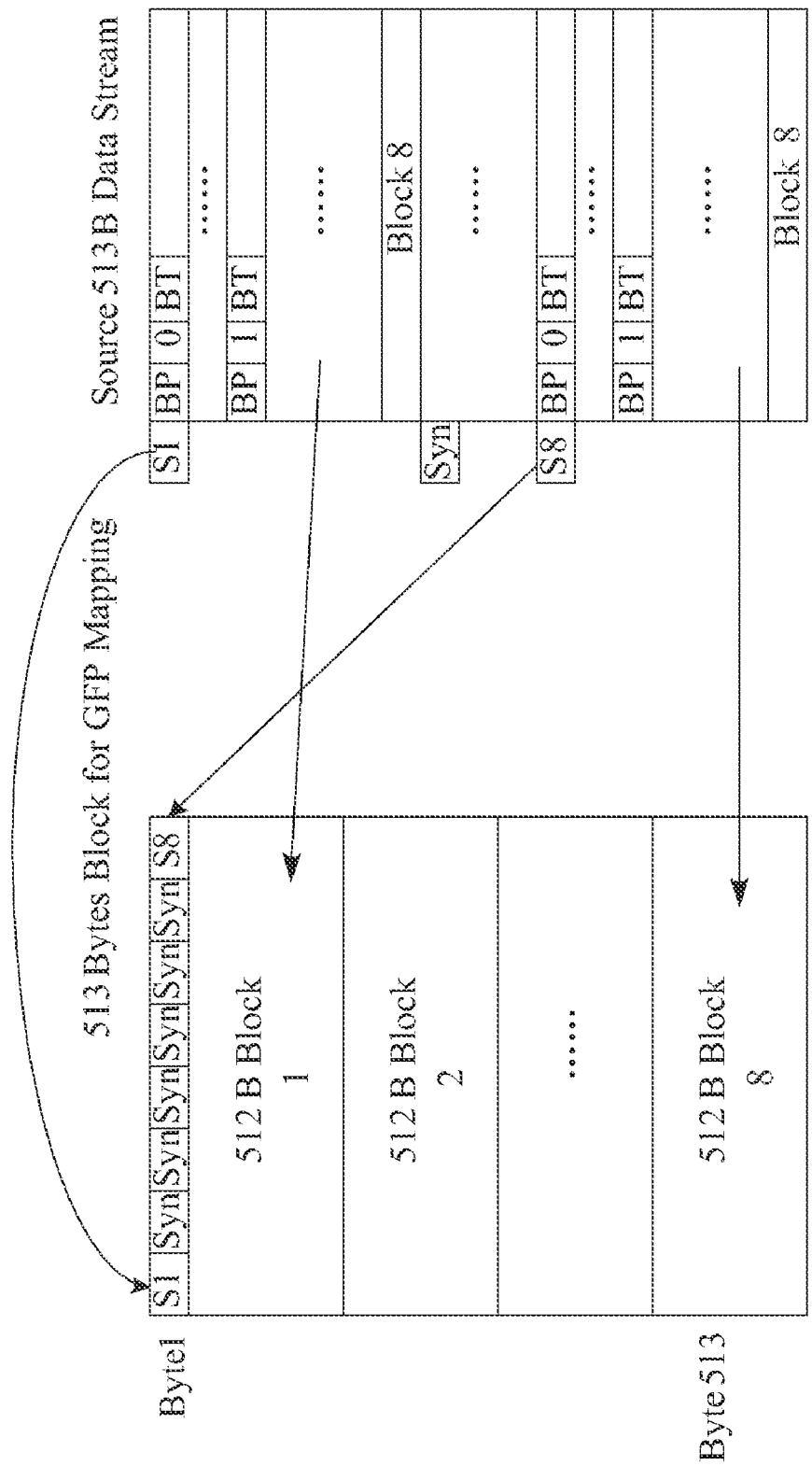
FIG. 5 is a schematic view of an instance of a mapping process for encapsulating eight 512-bit code blocks into a GFP frame according to the first embodiment of the present invention.

FIG. 5 is a schematic view of a mapping process for encapsulating eight 512-bit code blocks having an encoding rate lower than the minimum payload bandwidth of the OPU3 into a payload area of a GFP frame. In FIG. 5, a structure of 512-bit 40 G Ethernet code blocks are shown on the right, and a GFP frame structure obtained after mapping the code blocks to the GFP frame is shown on the left. It can be seen that, in the 40 G Ethernet code blocks on the right, every eight 512-bit code blocks are corresponding to a code block occupying one byte in the GFP frame on the left.

In the process for mapping the 40 G Ethernet code blocks to the GFP frame, a core header and a payload header also need to be added, and optionally, a payload FCS may be further added in order to ensure the transmission reliability. As a result, additional rate overhead is generated.

For the GFP structure obtained through the above process, a new UPI must be applied to identify the structure. For example, in the presence of an FCS, assuming that the GFP frame contains sixteen 513-byte blocks, 16*8 512-bit 40 G Ethernet code blocks may be mapped to the GFP frame; a header of the GFP frame may be set to PTI=000, PFI=1, and EXI=0000; UPI may be set to 0000 1111; and since the payload is 513*16=8208 bytes, it is set that PLI=8208+12=8220.

The above description merely provides an instance of the mapping process for arranging 512-bit 40 G Ethernet code blocks in a GFP frame, that is, an instance of the mapping process for gathering Syn fields of all the 512-bit code blocks into one byte and then arranging all the 512-bit code blocks after the Syn fields sequentially; however, the present invention is not limited to the arrangement method, and other methods may also be used to arrange the 40 G Ethernet code blocks in the GFP frame.

In step S102, the obtained GFP frame is mapped to the OPU3 of the OTN, and is sent out. When the GFP frame is sent, if it is found that payload data in the GFP frame is not enough to maintain continuous data transmission, justification control is performed on the GFP frame.

Figure 6:
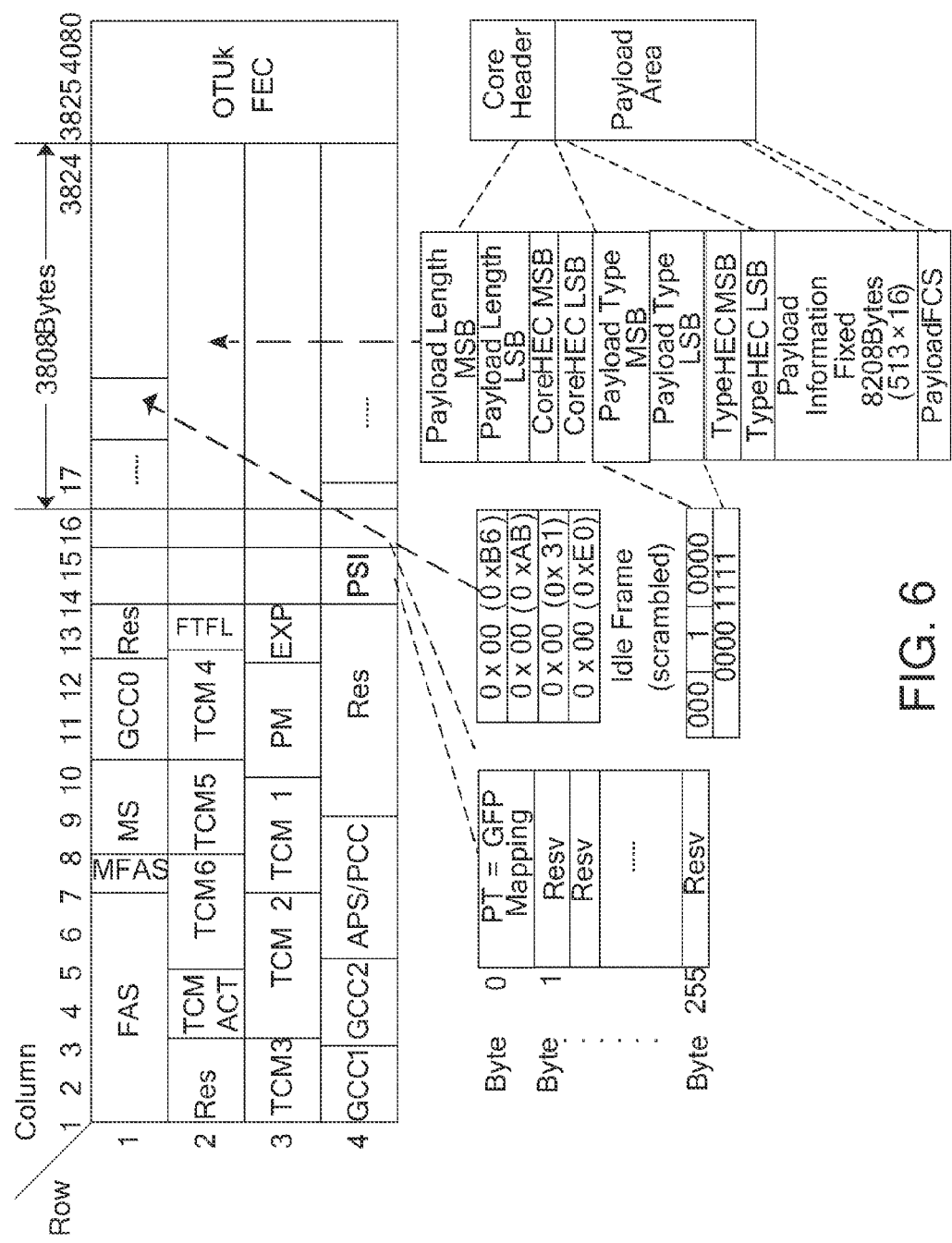
FIG. 6 is a schematic view of a mapping process for mapping the GFP frame to the OPU3 of the OTN according to the first embodiment of the present invention.

The instance of the mapping process for mapping the 16*8 512-bit 40 G Ethernet code blocks to the GFP frame containing sixteen 513-byte blocks in the presence of an FCS is still taken as an example, and FIG. 6 shows a mapping process for mapping the obtained GFP frame to the OPU3 of the OTN. It can be seen that, the obtained GFP frame is mapped to a payload area of an OTN frame corresponding to the OPU3, and a corresponding PT is set in a PSI to identify a GFP mapping manner.

Since the payload rate of the OPU3 is higher than the encoding rate of the 40 G Ethernet code blocks, the rate of the GFP frame obtained through mapping may be lower than the payload rate of the OPU3. Therefore, when the GFP frame is sent, client-layer data (that is, payload data) may be not enough to maintain continuous data transmission. At this time, an idle block for justification control needs to be filled when the 40 G Ethernet code blocks are mapped to the GFP frame.

Specifically, it is feasible to fill an idle block into the GFP frame and inform a receiving end of the idle block through the GFP, or fill an idle block such as an idle frame as shown in FIG. 6 into the OTN frame, or fill an idle block into the 40 G Ethernet code blocks having an encoding rate lower than the minimum payload bandwidth of the OPU3 and use a corresponding identifier to identify the idle block.

Corresponding to the above method, in the first embodiment, the present invention further provides a sending device, which includes a mapping unit and a transmission unit. The sending device may further include a justification unit.

The mapping unit is adapted to map a plurality of 40 G Ethernet code blocks to a payload area of a GFP frame according to a preset mapping manner, and set a corresponding identifier to identify the mapping manner. The specific implementation is similar to the related description in the above method embodiment, so the details will not be described herein again.

The transmission unit is adapted to map the GFP frame to an OTN, and send the GFP frame.

The justification unit is adapted to perform justification control on the GFP frame by using an idle block if it is found that data in the payload area of the GFP frame is not enough when the GFP frame is sent.

Corresponding to the method for mapping Ethernet code blocks to an OTN for transmission according to the first embodiment of the present invention, in the first embodiment, the present invention further provides a receiving and processing process of the method for mapping Ethernet code blocks to an OTN for transmission. The process is as follows.

A received GFP frame is decoded to obtain an identifier for identifying a mapping manner, and obtain a mapping manner for mapping a plurality of 40 G Ethernet code blocks to a payload area of the GFP frame according to a value of the identifier; and the 40 G Ethernet code blocks in the GFP frame are decoded according to the mapping manner. The specific steps are as follows.

The received GFP frame is decoded to obtain a core header, and the payload area of the GFP frame is decoded according to the core header to obtain a corresponding payload header.

A header UPI of the GFP frame is obtained according to the payload header, and the mapping manner for mapping the 40 G Ethernet code blocks to the payload area of the GFP frame is obtained according to a value of the UPI.

The 40 G Ethernet code blocks in the GFP frame are decoded according to the mapping manner.

If a corresponding idle block is found in the decoding process, the idle block is deleted.

Corresponding to the above receiving and processing process of the method, in the first embodiment, the present invention further provides a receiving device, which includes an information acquisition unit and a decoding unit.

The information acquisition unit is adapted to decode a received GFP frame to obtain an identifier for identifying a mapping manner, and obtain a mapping manner for mapping a plurality of 40 G Ethernet code blocks to a payload area of the GFP frame according to a value of the identifier.

The decoding unit is adapted to decode the 40 G Ethernet code blocks in the GFP frame according to the mapping manner. The decoding unit is further adapted to delete a corresponding idle block for justification control after the idle block is found in the decoding process.

Figure 7:
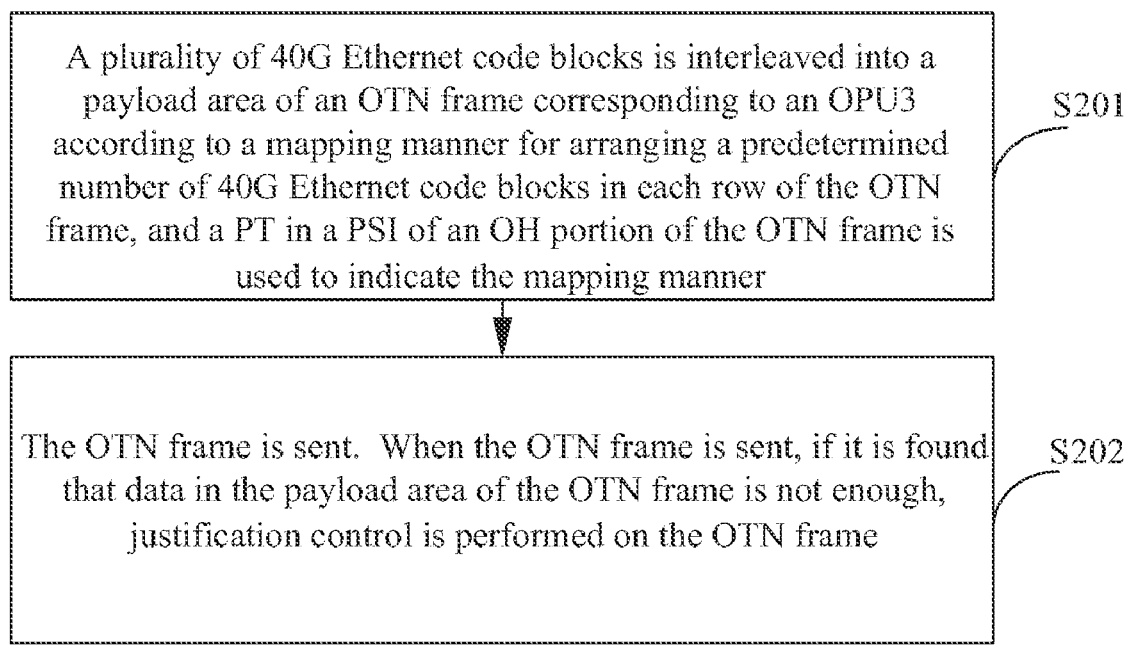
FIG. 7 is a flow chart according to a second embodiment of the present invention.

In a second embodiment, the present invention further provides a method for mapping Ethernet code blocks to an OTN for transmission, which uses an inserting mode to map a plurality of 40 G Ethernet code blocks to an OTN for transmission. Referring to FIG. 7, the method includes the following steps.

In step S201, a plurality of 40 G Ethernet code blocks is inserted into a payload area of an OTN frame corresponding to an OPU3 according to a mapping manner for arranging a predetermined number of 40 G Ethernet code blocks in each row of the OTN frame, and a PT in a PSI of an OH portion of the OTN frame is used to indicate the mapping manner.

The code blocks in each row of the OTN frame corresponding to the OPU3 may be arranged in different orders. The number of code blocks to be arranged in each row of the OTN frame corresponding to the OPU3 may be determined by the size of the 40 G Ethernet code blocks and the number of bytes occupied by each row of the payload area of the OTN frame corresponding to the OPU3.

The maximum value of the number K of 40 G Ethernet code blocks that can be arranged in each row of the payload area of the OTN frame is calculated according to 3808 bytes, that is, 3808 Bytes*8 Bit/Bytes=30464 Bit, occupied by each row of the payload area of the OTN frame corresponding to the OPU3, as well as the size of the 40 G Ethernet code blocks having an encoding rate lower than the payload rate corresponding to the OPU3, such as 1217 Bit.

Since 1217 Bit*25=30425 Bit≦30464 Bit≦1217 Bit*26=31642 Bit, it can be seen that at most 25 1217-Bit 40 G Ethernet code blocks can be arranged in each row. The tolerance is (30464−30425)/30464=0.00012802, that is 128 ppm.

Figure 8:
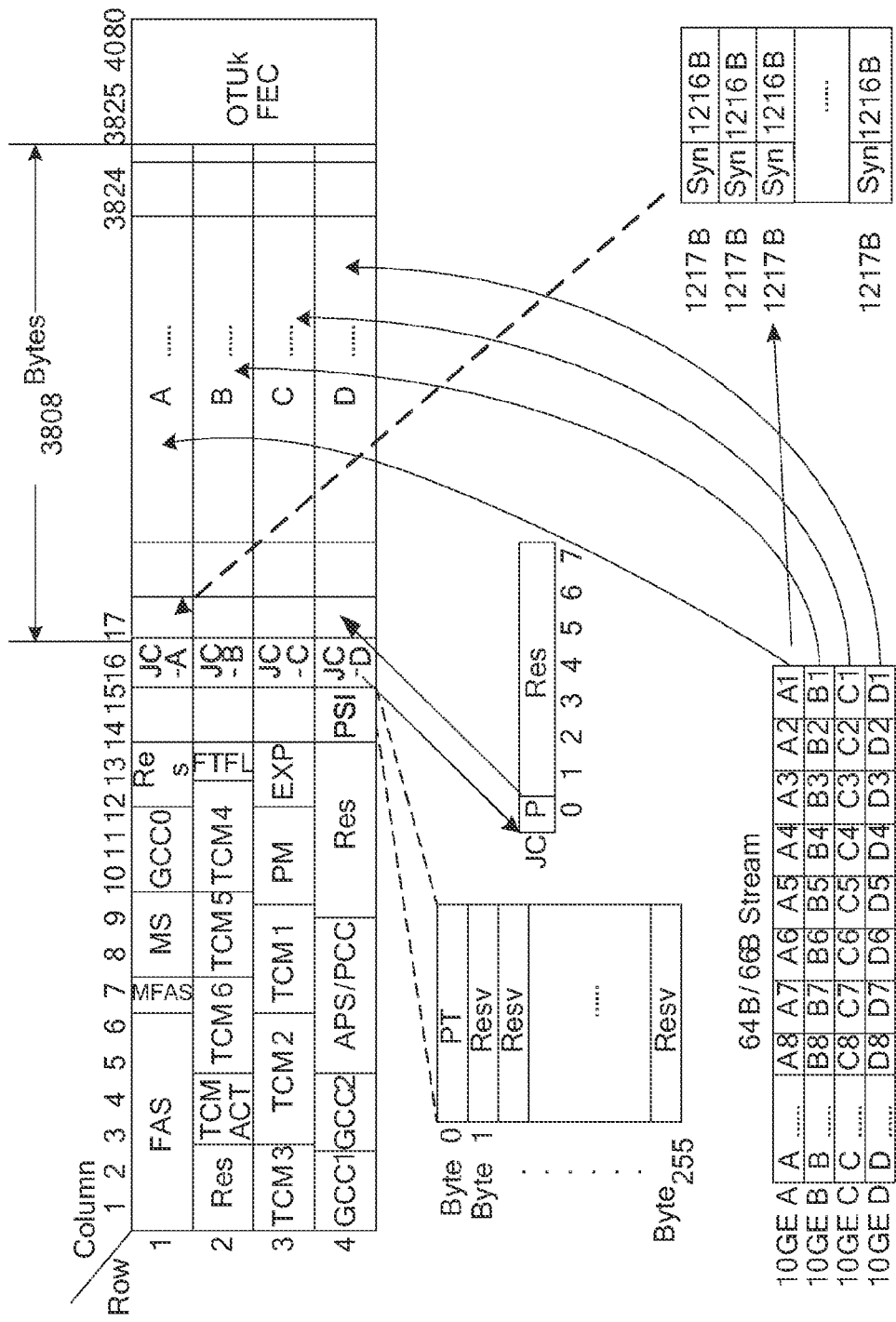
FIG. 8 is a schematic view of an instance of a mapping process for mapping code blocks to an OTN according to the second embodiment of the present invention.

Referring to FIG. 8, an instance of a mapping process for mapping a plurality of 1217-Bit 40 G Ethernet code blocks to an OTN frame is provided. It can be seen that, a plurality of 1217-Bit 40 G Ethernet code blocks is mapped to the payload area of each row of the OTN frame corresponding to the OPU3 (corresponding to the 3808 Bytes portion in the figure), and a PT in a PSI of an OH portion of the OTN frame is used to indicate the mapping manner.

In step S202, the OTN frame is sent. When the OTN frame is sent, if it is found that data in the payload area of the OTN frame is not enough, justification control is performed on the OTN frame.

It is feasible to insert an idle block containing no data into the OTN frame, and set a justification control (JC) identifier in a client specific portion of the OTN frame to identify that the idle block is adapted for justification control.

The 1217-Bit 40 G Ethernet code blocks are still taken as an example. Since each row can accommodate 25 1217-Bit 40 G Ethernet code blocks, the number of bits occupied by each row is 1217 Bit*25=30425 Bit. Since each row of the payload area of the OTN frame corresponding to the OPU3 occupies 3808 bytes, that is, 3808 Bytes*8 Bit/Bytes=30464 Bit, the minimum rate of the OPU3 is 30425/30464*40.149716311=40.098316661 GBits/s. It can be seen that, the minimum rate of the OPU3 is higher than the maximum encoding rate of 40 G Ethernet signals calculated according to a clock offset of ±100 ppm, that is, 40*1217/1216*1.0001=40.036898026 GBits/s. Therefore, justification control needs to be performed in the process of encoding the OTN frame.

When justification control is performed, the first block of the last row may be set to a justification block, and a JC identifier may be set to identify the justification block. Other blocks of the last row may also be set to justification blocks, and JC identifiers may be set to identify the justification blocks. In a word, the justification opportunity space is changeable. If it is found in the encoding process that the data in the payload area of the OTN frame is enough, it is determined that justification control is not needed, and accordingly, the justification block is set to a code block containing data, and a justification opportunity overhead P in the JC is set to 0. If it is found in the process for sending the OTN frame that the data in the payload area of the OTN frame is not enough, the justification block is set to an idle block containing no data, and the justification opportunity overhead P in the JC is set to 1. In this way, the encoding rate of the OTN frame corresponding to the OPU3 is:

$$1217*(25*4-1)/(30464*4)\\*40.149716311=39.697333494 \text{ GBits/s}.$$

in which 1217 represents the size of the 40 G Ethernet code blocks, (25*4−1) represents the number of valid code blocks that can be arranged in four rows of the OTN frame, (30464*4) represents the maximum number of bits of the code blocks that can be arranged in the four rows of the OTN frame, and 40.149716311 represents the minimum payload rate of the OPU3 when the clock offset is ±100 ppm in the OTN.

Compared with the minimum Ethernet encoding rate of the 40 G Ethernet code blocks obtained according to the clock offset of ±100 ppm, that is, 40*1217/1216*0.999900=40.028891447 GBits/s, it can be seen that, the encoding rate of the OTN frame corresponding to the OPU3 obtained after the justification control process is lower than the minimum Ethernet encoding rate of the 40 G Ethernet code blocks.

The instance of the mapping process for mapping a plurality of 1217-Bit 40 G Ethernet standard code blocks to an OTN frame as shown in FIG. 8 is still taken as an example. It can be seen that, the first block in the payload area of the last row of the OTN frame is used as a justification block, and if justification control is not needed, the justification block is set to a code block containing data, and a justification opportunity overhead P in the JC is set to 0; and if it is found in the process for sending the OTN frame that the data in the payload area of the OTN frame is not enough, the justification block is set to an idle block containing no data, and the justification opportunity overhead P in the JC is set to 1.

Of course, the position of the justification block is not limited to the first block in the payload area of the last row of the OTN frame, and may also be other blocks. Likewise, the position of the justification indicator P may also vary.

The above description is given by taking the mapping process for mapping a plurality of 1217-Bit 40 G Ethernet code blocks to an OTN frame as an example; however, the present invention is not thus limited, but may also be implemented to map other code blocks of any size having an encoding rate lower than the payload rate of the OPU3 of the OTN to the OTN frame.

Corresponding to the method according to the second embodiment of the present invention, in a second embodiment, the present invention further provides a sending device, which includes a mapping unit and a transmission unit. The sending device may further include a justification unit.

The mapping unit is adapted to insert a plurality of 40 G Ethernet code blocks into a payload area of an OTN frame corresponding to an OPU3 according to a mapping manner for arranging a predetermined number of 40 G Ethernet code blocks in each row of the OTN frame, and set a corresponding mapping manner indication identifier at an OH portion of the OTN frame to indicate the mapping manner.

The transmission unit is adapted to map the obtained OTN frame to the OPU3 of the OTN, and send the OTN frame.

The justification unit is adapted to perform justification control on the OTN frame by using an idle block if it is found that data in the payload area of the OTN frame is not enough when the OTN frame is sent, and set a corresponding JC identifier at the OH portion of the OTN frame to indicate that the idle block is adapted for justification control.

Corresponding to the method according to the second embodiment of the present invention, in the second embodiment, the present invention further provides a receiving and processing process of the method for mapping Ethernet code blocks to an OTN for transmission. The process is as follows.

A received OTN frame is decoded to obtain a mapping manner indication identifier, and a mapping manner for arranging a predetermined number of 40 G Ethernet code blocks in each row of the OTN frame corresponding to an OPU3 is obtained according to the mapping manner indication identifier; the 40 G Ethernet code blocks in the OTN frame are decoded according to the mapping manner; a corresponding JC identifier in the decoding process is obtained, it is determined whether an idle block is inserted into the OTN frame according to the JC identifier, and the idle block is deleted after determining that the idle block is inserted. The specific steps are as follows.

The received OTN frame is decoded to obtain a PT in a PSI of an OH portion of the OTN frame.

The mapping manner for arranging the predetermined number of 40 G Ethernet code blocks in each row of the OTN frame corresponding to the OPU3 is obtained according to the PT, and the 40 G Ethernet code blocks in the OTN frame are decoded according to the mapping manner.

An indicator P for indicating justification is obtained in the decoding process, it is determined whether an idle block is inserted into the OTN frame according to the indicator P, and the idle block is deleted if the idle block is inserted.

Corresponding to the receiving and processing process according to the second embodiment of the present invention, in the second embodiment, the present invention further provides a receiving and processing device, which includes an information acquisition unit and a decoding unit.

The information acquisition unit is adapted to decode a received OTN frame to obtain a mapping manner indication identifier, and obtain a mapping manner for arranging a predetermined number of 40 G Ethernet code blocks in each row of the OTN frame corresponding to an OPU3 according to the mapping manner indication identifier.

The decoding unit is adapted to decode the 40 G Ethernet code blocks in the OTN frame according to the mapping manner. The decoding unit is further adapted to determine whether an idle block is inserted into the OTN frame according to a JC identifier in the OTN frame, and delete the idle block after determining that the idle block is inserted.

In a third embodiment, the present invention further provides a method for mapping Ethernet code blocks to an OTN for transmission, which uses an asynchronous bit-stream mapping method to map a plurality of 40 G Ethernet code blocks to an OTN frame. Referring to FIG. 9, the method includes the following steps.

In step S301, a plurality of 40 G Ethernet code blocks having an encoding rate lower than a payload rate corresponding to an OPU3 is mapped to an OTN frame corresponding to the OPU3 as a bit stream within a justification range according to an asynchronous bit-stream mapping manner, an identifier for indicating the asynchronous bit-stream mapping manner is allocated in a PSI of the OTN frame, an offset of a certain code block in the bit stream relative to a certain position of the OTN frame (for example, relative to the first byte or bit of the OTN frame) is recorded, and an indicator for indicating the offset position is set.

Figure 10:
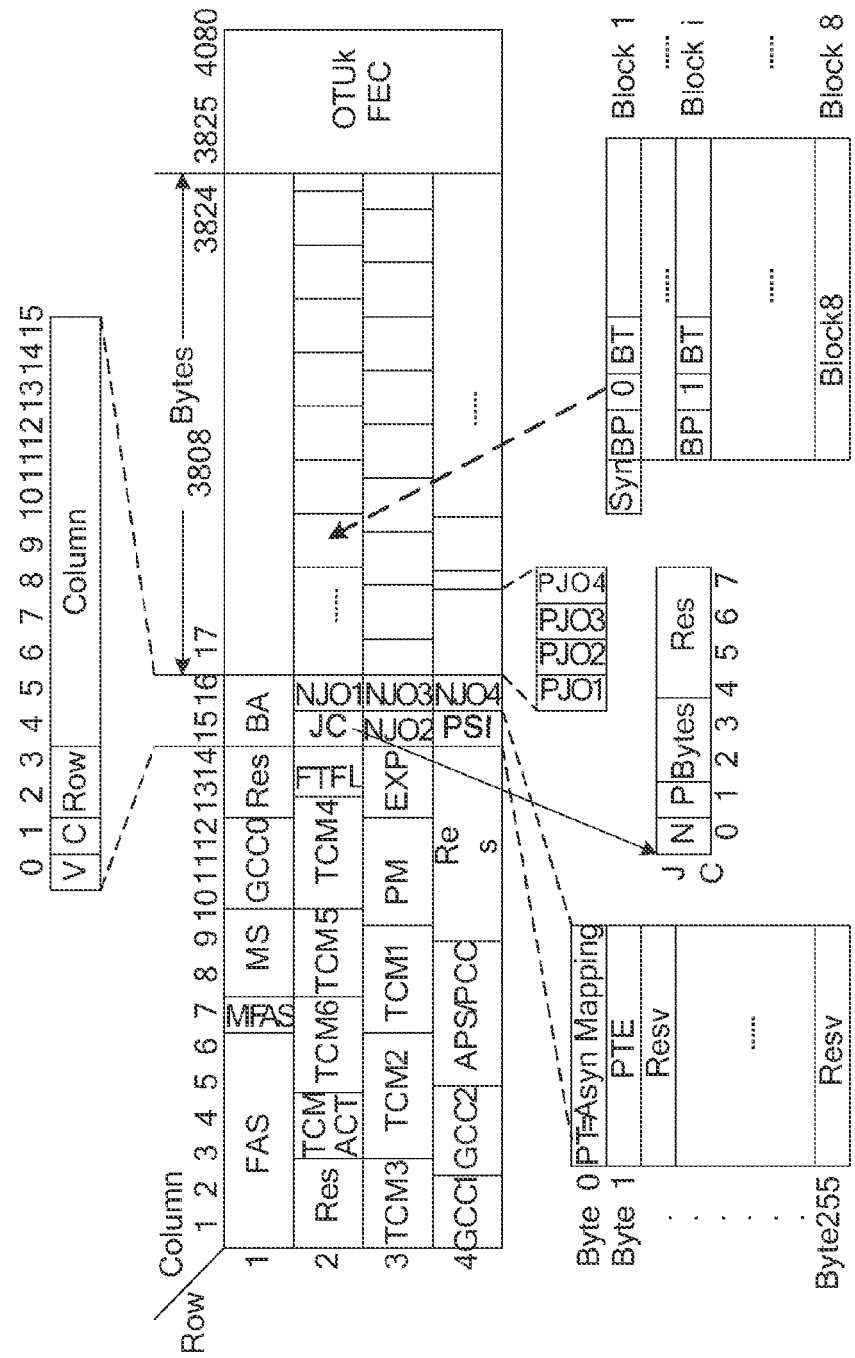
FIG. 10 is a schematic view of an instance of a mapping process for mapping code blocks to an OTN according to the third embodiment of the present invention.

Taking an instance of the mapping process shown in FIG. 10 as an example, a PT may be allocated in the second byte of the PSI to indicate the asynchronous bit-stream mapping manner, that is, to indicate the features of the bit stream that is actually mapped.

The $15^{th}$ and $16^{th}$ bytes in the first row of the OPU overhead may be used to indicate the offset position of the code block, that is, be used as a Block Align (BA) indicator. The specific steps are as follows.

An identifier V occupying one bit is used to indicate whether this cycle contains valid data, with 1 indicating yes and 0 indicating no.

An identifier Row occupying two bits and an identifier Column occupying twelve bits are used to represent the position of the first frame delimiter of the data stream in this cycle on an 8-bit boundary.

An identifier C occupying one bit is used to indicate whether data before the frame delimiter in this cycle is continuous data of the previous cycle, with C=0 indicating that valid data starts from this cycle, and C=1 indicating that valid data exists before this cycle, and the data before the frame delimiter in this cycle needs to be decoded with the previous cycle.

In step S302, the OTN frame is sent out. When the OTN frame is sent, if it is found that data in the payload area of the OTN frame is not enough, justification control is performed on the OTN frame.

It is feasible to insert an idle block containing no data into the OTN frame, and set a JC identifier for identifying the idle block in a client specific portion of the OTN frame to indicate a justification control condition.

The instance of the mapping process shown in FIG. 10 is still taken as an example for description, it can be seen that, a JC indicator is set at the 15$^{th}$ byte in the second row to indicate the justification control condition. The specific steps are as follows.

N occupying one bit is used to represent negative justification indication, with N=1 representing that negative justification is required, and N=0 representing that negative justification is not required.

P occupying one bit is used to represent positive justification indication, with P=1 representing that positive justification is required, and P=0 representing that positive justification is not required.

N and P cannot be 1 at the same time.

Bytes occupying two bits are used to represent the number of bytes to be justified.

NJO occupying four bits is used to represent negative justification opportunity overhead.

PJO occupying four bits is used to represent positive justification opportunity overhead.

In the third embodiment, the offset of the code block is located by using the 15$^{th}$ and 16$^{th}$ bytes in the first row of the OPU OH to indicate the offset position of the code block; however, the present invention is not limited to using the 15$^{th}$ and 16$^{th}$ bytes in the first row of the OPU overhead, and the offset position of the code block may also be located according to other positions.

In addition, the position of the justification indicator may vary, and the justification opportunity space may also vary.

Corresponding to the method according to the third embodiment of the present invention, in the third embodiment, the present invention further provides a sending device, which includes a mapping unit and a transmission unit. The sending device may further include a justification unit.

The mapping unit is adapted to map a plurality of 40 G Ethernet code blocks to an OTN frame corresponding to an OPU3 as a bit stream within a justification range according to an asynchronous bit-stream mapping manner, set an identifier for indicating the asynchronous bit-stream mapping manner at an OH portion of the OTN frame, record an offset of a certain code block in the bit stream relative to a certain position of the OTN frame, and set an indicator for indicating the offset position.

The transmission unit is adapted to map the obtained OTN frame to the OPU3 of the OTN, and send the OTN frame.

The justification unit is adapted to perform justification control on the OTN frame by using an idle block if it is found that data in the payload area of the OTN frame is not enough when the OTN frame is sent, and set a corresponding JC identifier at the OH portion of the OTN frame to indicate that the idle block is adapted for justification control.

Corresponding to the method for mapping a plurality of 40 G Ethernet code blocks to an OTN for transmission, in the third embodiment, the present invention further provides a corresponding receiving and processing process. The process is as follows.

A received OTN frame is decoded to obtain an indicator for indicating an offset position of a code block and an identifier for indicating a mapping manner, a position of the code block in the OTN frame is located according to the indicator for indicating the offset position of the code block, positions of other code blocks are calculated according to a size of the code block, and it is acquired that the mapping manner for mapping 40 G Ethernet code blocks to the OTN frame is an asynchronous stream mapping manner according to the identifier for indicating the mapping manner; and the 40 G Ethernet code blocks at corresponding positions are decoded according to the asynchronous stream mapping manner. The specific steps are as follows.

The received OTN frame is decoded to obtain a BA indicator for indicating an offset position of a code block and a PT identifier for indicating a mapping manner.

A position of the code block in the OTN frame is located according to the BA indicator for indicating the offset position of the code block, positions of other code blocks are calculated according to a size of the code block, and it is acquired according to the PT identifier that the mapping manner for mapping 40 G Ethernet code blocks to the OTN frame is an asynchronous stream mapping manner.

Code blocks at corresponding positions are decoded according to the asynchronous stream mapping manner.

In addition, a justification indicator may also be obtained in the decoding process. It is determined whether the current OTN frame contains an idle block for justification control according to the justification indicator, and the idle block is deleted after determining that the current OTN frame contains the idle block for justification control.

Corresponding to the receiving and processing process according to the third embodiment of the present invention, in the third embodiment, the present invention further provides a receiving device, which includes an information acquisition unit and a decoding unit.

The information acquisition unit is adapted to decode a received OTN frame to obtain an indicator for indicating an offset position of a code block and an identifier for indicating a mapping manner, locate a position of the code block in the OTN frame according to the indicator for indicating the offset position of the code block, calculate positions of other code blocks according to a size of the code block, and acquire that the mapping manner for mapping 40 G Ethernet code blocks to the OTN frame is an asynchronous stream mapping manner according to the identifier for indicating the mapping manner.

The decoding unit is adapted to decode the 40 G Ethernet code blocks at corresponding positions according to the mapping manner. The decoding unit is further adapted to determine whether an idle block is inserted into the OTN frame according to a corresponding JC identifier in the OTN frame, and delete the idle block after determining that the idle block is inserted.

It can be seen from the technical solutions of the present invention that, in the present invention, according to the preset mapping manner, the 40 G Ethernet code blocks are mapped to the payload area of the GFP frame, or the 40 G Ethernet code blocks are inserted into the payload area of the OTN frame, or the 40 G Ethernet code blocks are asynchronously bit-stream mapped to the OTN frame. Thus, the present invention provides specific solutions for mapping 40 G Ethernet code blocks having an encoding rate lower than the minimum payload bandwidth of the OPU3 to the OTN for transmission without changing the mature OTN architecture.

It will be apparent to persons skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A method for mapping Ethernet code blocks to an optical transport network (OTN) for transmission, comprising:
   taking a plurality number of 40 G Ethernet code blocks as a code block group;
   mapping the code block group to a payload area of a general frame provision (GFP) frame according to a preset mapping manner, and setting a corresponding identifier to identify the mapping manner; and mapping the GFP frame to the OTN, and sending the GFP frame;

wherein, the 40 Gigabit Ethernet code blocks are encoded through a 64/66B encoding scheme, and an encoding rate required by a physical (PHY) layer is 66/64*40 GBits/s=41.25 GBits/s; and a rate of the GFP frame is lower than the minimum payload rate of an optical channel payload unit 3 (OPU3);

wherein, when the number of the 40 G Ethernet code blocks is 8, the code block group comprises 512/513 bits;

when the number of the 40 G Ethernet code blocks is 16, the code block group comprises 1216/1217 bits.

2. The method according to claim 1, wherein the setting the corresponding identifier to identify the mapping manner comprises:

setting a core header of the GFP frame to identify the payload area; and setting a payload type of the payload area, and setting a header user payload identifier (UPI) in the payload type, to identify the mapping manner.

3. The method according to claim 2, further comprising:

performing justification control on the GFP frame by using an idle block if it is found that data in the payload area of the GFP frame is not enough when the GFP frame is sent.

4. The method according to claim 3, wherein the performing the justification control on the GFP frame by using the idle block comprises:

inserting an idle block containing no data into the GFP frame; or inserting the idle block containing no data into the 40 G Ethernet code blocks in the GFP frame, and using another corresponding identifier to indicate that the idle block is adapted for justification control.

5. A sending device, comprising:

a mapping unit, adapted to take a plurality number of 40 G Ethernet code blocks as a code block group and map the code block group to a payload area of a general frame provision (GFP) frame according to a preset mapping manner, and set a corresponding identifier to identify the mapping manner; and a transmission unit, adapted to map the GFP frame to an optical transport network (OTN), and send the GFP frame;

wherein, the 40 Gigabit Ethernet code blocks is encoded through a 64/66B encoding scheme, and a encoding rate required by a physical (PHY) layer is 66/64*40 GBits/s=41.25 GBits/s;

wherein a rate of the GFP frame is lower than the minimum payload rate of an optical channel payload unit 3 (OPU3);

wherein when the number of the 40 G Ethernet code blocks is 8 the code block group comprises 512/513 bits;

when the number of the 40 G Ethernet code blocks is 16, the code block group comprises 1216/1217 bits.

6. The device according to claim 5, further comprising:

a justification unit, adapted to perform justification control on the GFP frame by using an idle block if it is found that data in the payload area of the GFP frame is not enough when the GFP frame is sent.

7. A method for mapping Ethernet code blocks to an optical transport network (OTN) for transmission, comprising:

taking a plurality number of 40 G Ethernet code blocks as a code block group;

inserting the code block group into a payload area of an OTN frame corresponding to an optical channel payload unit 3 (OPU3) according to a mapping manner for arranging a predetermined number of 40 G Ethernet code blocks in each row of the OTN frame, and setting a corresponding mapping manner indication identifier at an overhead (OH) portion of the OTN frame to indicate the mapping manner; and mapping the obtained OTN frame to the OPU3 of the OTN, and sending the OTN frame;

wherein the 40 Gigabit Ethernet code blocks are encoded through a 64/66B encoding scheme, and an encoding rate required by (PHY) layer is 66/64*40 GBits/s=41.25 GBits/s; and a rate of the GFP frame is lower than the minimum payload rate of the OPU3;

wherein, when the number of the 40 G Ethernet code blocks is 8, the code block group comprises 512/513 bits;

when the number of the 40 G Ethernet code blocks is 16, the code block group comprises 1216/1217 bits.

8. The method according to claim 7, wherein the setting the corresponding mapping manner indication identifier to indicate the mapping manner comprises:

setting the corresponding mapping manner indication identifier in a payload structure identifier (PSI) of the OH portion of the OTN frame to indicate the mapping manner.

9. The method according to claim 8, further comprising:

performing justification control on the OTN frame by using an idle block if it is found that data in the payload area of the OTN frame is not enough when the OTN frame is sent, and setting a corresponding justification control (JC) identifier at the OH portion of the OTN frame to indicate that the idle block is adapted for justification control.

10. The method according to claim 9, wherein the performing the justification control on the OTN frame by using the idle block, and setting the corresponding JC identifier at the OH portion of the OTN frame to indicate that the idle block is adapted for justification control comprise:

inserting the idle block containing no data into the OTN frame, and setting the JC identifier in a client specific portion of the OH portion of the OTN frame to identify that the idle block is adapted for justification control.

11. A method for mapping Ethernet code blocks to an optical transport network (OTN) for transmission, comprising:

taking a plurality number of 40 G Ethernet code blocks as a code block group;

mapping the code block group to an OTN frame corresponding to an optical channel payload unit 3 (OPU3) as a bit stream within a justification range according to an asynchronous bit-stream mapping manner, setting an identifier for indicating the asynchronous bit-stream mapping manner at an overhead (OH) portion of the OTN frame, recording an offset of a certain code block in the bit stream relative to a certain position of the OTN frame, and setting an indicator for indicating the offset position; and mapping the obtained OTN frame to the OPU3 of the OTN, and sending the OTN frame;

wherein, the 40 Gigabit Ethernet code blocks are encoded through a 64/66B encoding scheme, and an encoding rate required by a physical (PHY) layer is 66/64*40 GBits/s=41.25 GBits/s; and a rate of the GFP frame is lower than the minimum payload rate of the OPU3;

wherein, when the number of the 40 G Ethernet code blocks is 8, the code block group comprises 512/513 bits;

when the number of the 40 G Ethernet code blocks is 16, the code block group comprises 1216/1217 bits.

12. The method according to claim 11, wherein the setting the identifier for indicating the asynchronous bit-stream mapping manner at the OH portion of the OTN frame comprises:
allocating a PT identifier for indicating the asynchronous bit-stream mapping manner in a payload structure identifier (PSI) of the OH portion of the OTN frame to indicate the asynchronous bit-stream mapping manner.

13. The method according to claim 11, wherein the setting the indicator for indicating the offset position comprises:
allocating a Block Align (BA) indicator for indicating the offset position in the OH portion of the OTN frame to indicate the offset position.

14. The method according to claim 13, further comprising:
performing justification control on the OTN frame by using an idle block if it is found that data in the payload area of the OTN frame is not enough when the OTN frame is sent, and setting a corresponding justification control (JC) identifier at the OH portion of the OTN frame to indicate that the idle block is adapted for justification control.

15. The method according to claim 14, wherein the performing the justification control on the OTN frame by using the idle block, and setting the corresponding JC identifier at the OH portion of the OTN frame to indicate that the idle block is adapted for justification control comprises:
inserting the idle block containing no data into the OTN frame, and setting the corresponding JC identifier in a client specific portion of the OH portion of the OTN frame to indicate that the idle block is adapted for justification control.

* * * * *